United States Patent [19]
Akiho et al.

[11] Patent Number: 4,787,004
[45] Date of Patent: Nov. 22, 1988

[54] MAGNETIC HEAD INCLUDING SINGLE CRYSTAL AND POLYCRYSTALLINE FERRITES WITH INTERFACIAL OXIDE LAYER

[75] Inventors: Hiraku Akiho; Hideaki Karamon; Sadayuki Nishiuchi; Toru Sugai, Miayagi, all of Japan

[73] Assignee: Sony Corporation, Tokyo, Japan

[21] Appl. No.: 70,021

[22] Filed: Jul. 6, 1987

[30] Foreign Application Priority Data

Jul. 7, 1986 [JP] Japan .................................. 61-158987

[51] Int. Cl.⁴ ..................... G11B 5/193; G11B 5/187
[52] U.S. Cl. ..................................... 360/127; 360/122
[58] Field of Search ..................... 360/127, 122, 126

[56] References Cited

U.S. PATENT DOCUMENTS

4,409,633 10/1983 Watanabe et al. .................. 360/127

Primary Examiner—Robert S. Tupper

[57] ABSTRACT

A composite magnetic head in which a single crystal ferrite is used at the slide contact portion with the magnetic recording medium and a polycrystalline ferrite is used at the portion constituting the back magnetic circuit, is disclosed. An oxide magnetic thin film is formed at the junction interface between the single crystal ferrite and the polycrystalline ferrite for providing a magnetic head free from diffusion at the junction surface and evidencing only a low slide noise level.

8 Claims, 8 Drawing Sheets

MAGNETIC HEAD INCLUDING SINGLE CRYSTAL AND POLYCRYSTALLINE FERRITES WITH INTERFACIAL OXIDE LAYER

BACKGROUND OF THE INVENTION

1. Field of the Invention

This invention relates to a composite type junction ferrite magnetic head constituted of a single crystal ferrite and a polycrystalline ferrite. More particularly, it relates to an improvement for reducing the slide noise of such a magnetic head.

2. Description of the Prior Art

Recently, for meeting the demand for long playing and miniaturized video tape recorders, for example, and the debut of so-called digital video tape recorders, there have been attempts to make high density recording or a recording at shorter wavelengths. In association therewith, the use of a high coercive force magnetic recording medium has become popular.

With the conventional monolithic ferrite head, it is difficult to achieve good compatibility between the recording and reproducing properties. Thus a so-called junction ferrite type magnetic head has been proposed in which a single crystal ferrite having a high saturation magnetic flux is used at the front gap contacting the magnetic recording medium and a polycrystalline ferrite having a high magnetic permeability is used at the back gap.

This junction ferrite type magnetic head is superior in electromagnetic conversion properties, while being able to make a high density recording, although it has a simplified structure similar to that of the monolithic ferrite head.

In preparing the aforementioned junction ferrite magnetic head, one may use a glass melt bonding method for bonding the single crystal and polycrystalline portions to each other. Although it is possible with this method to set the melt bonding temperature to as low as 900° C. to reduce the diffusion of the ferrite monocrystals, this method has the disadvantages that a glass film with a thickness of the order of 300 to 1200 Å is interposed between the single crystal ferrite and the polycrystalline ferrite, so that an internal strain is produced due to the difference in thermal expansion coefficients; that the magnetic reluctance is increased due to the presence of the insulating glass material so that the S/N ratio is lowered; and that the glass tends to erode the ferrite portions of the magnetic head.

There has also been proposed a so-called hot press working process according to which the single crystal and polycrystalline ferrites are directly bonded together under a nitrogen atmosphere at a pressure of not lower than 5 kg/cm$^2$ and a temperature of 1200 to 1300° C.

However, proper selection of the bonding conditions is difficult to achieve with this hot press working process. Moreover, the interface between the single crystal and polycrystalline portions tends to be inundated due to dispersion of the ferrite monocrystals. In addition, since the diffusion layer at the junction interface between the single crystal ferrite and the polycrystalline ferrite may reach 70 to 300 microns, considerable dispersions may be produced in the thickness of the single crystal ferrite portion of the produced magnetic head.

On the other hand, our experiments have revealed that, when the aforementioned junction ferrite is used in the magnetic head for a video tape recorder, the thickness of the single crystal ferrite portion, including that of the diffusion layer, is closely related with the sliding noise, such that, as the single crystal ferrite portion becomes larger in thickness, the sliding noise is concomitantly increased.

Therefore, while the thickness of the single crystal ferrite portion should ideally be about equal to the depth of the magnetic gap, such thickness is difficult to control due to diffusions or inundations in the interface when the magnetic head is produced by the aforementioned hot press working. Thus the current practice is to design the thickness so as to be slightly larger than the depth of the magnetic gap for the sake of safety.

The technique of providing Co, CoO or Co$_3$O$_4$ in the interface has also been proposed, but the noise level of the magnetic head may not be lowered since the diffusion of the monocrystal ferrite may inevitably be of the order of 100 microns.

SUMMARY OF THE INVENTION

It is a principal object of the present invention to overcome the aforementioned deficiencies of the prior art and to provide a junction ferrite type magnetic head in which the thickness of the single crystal ferrite is controlled to an optimum value by suppressing the formation of the ferrite monocrystal layer.

It is a further object of the present invention to provide a junction type magnetic head having a low slide noise level.

As a result of our prolonged researches into attaining the aforementioned object, we have found that an oxide magnetic thin film is highly effective for this purpose when interposed at the interface between the single crystal ferrite and the polycrystalline ferrite.

On the basis of such finding, the present invention provides a composite magnetic head using a single crystal ferrite at the slide contact portion and a polycrystalline portion at a portion constituting a back magnetic circuit, characterized in that an oxide magnetic thin film is formed at the junction interface between the single crystal ferrite and the polycrystalline ferrite.

BRIEF DESCRIPTION OF THE DRAWINGS

FIGS. 4 and 5 are micrographs showing the crystal structure at the interface or boundary of the crystal grains between the single crystal ferrite and the polycrystalline ferrite, wherein

DETAILED DESCRIPTION OF THE INVENTION

In preparing a junction ferrite type magnetic head, when the single crystal ferrite and the polycrystalline ferrite are bonded together at an elevated temperature and an elevated pressure, there is produced a phenomenon in which the interface between the ferrites is moved rather irregularly towards the polycrystalline ferrite.

Such phenomenon is caused by crystal grain growth according to which the crystal grains of the polycrystalline ferrite are aligned in orientation with the single crystal ferrite, due to solid phase diffusion.

It is an important feature of the present invention to minimize the phenomenon of such interface shifting by the interposition of an oxide magnetic thin film at the interface between the ferrites.

It is thought that underlying this phenomenon is the structure of the crystal grains of the oxide magnetic thin film. Thus, since the crystal grains of the oxide magnetic thin film are extremely fine and uniform as compared to those of the polycrystalline ferrite produced by the conventional powder metallurgical process, the non-continuous grain growth phenomenon described below is presumed to account for the inhibition of the interface movement.

It is known in general that the growth of the crystal grains in the process of ferrite sintering depends appreciably on the initial crystal grain size, that is, on the initial powder diameter, such that the phenomenon of the growth of noncontinuous crystal grains presents itself in case of the polycrystal having fine crystal grains exhibiting a correctly aligned crystal orientation. The non-continuous crystal growth means a phenomenon in which crystal grains are not grown gradually under heating, but start to grow acutely in size at a certain temperature $T_x$. Unique to the non-continuous grain growth is that the grain growth is not caused to any appreciable extent when heating the crystal at a temperature not higher than the temperature $T_x$.

Hence it may be thought that the single crystal ferrite and the polycrystalline ferrite can be bonded together at a temperature lower than the crystal growth start temperature $T_x$ for the oxide magnetic thin film in order to inhibit the crystal grain growth and hence the interfacial movement described above.

In accordance with the present invention, the oxide magnetic thin film is interposed at the junction interface between the single crystal ferrite and the polycrystalline ferrite, so that the dispersion in the junction interface is extensively inhibited to prevent the occurrence of interface inundations, while the thickness of the single crystal ferrite portion can be correctly maintained at a predetermined value. Thus the junction ferrite type magnetic head according to the present invention evidences only an extremely low slide noise level.

In addition, the S/N ratio of the magnetic head may also be improved since the oxide magnetic thin film that is interposed between the single crystal ferrite and the polycrystalline ferrite does not affect the magnetic coupling at the junction boundary portions.

A preferred embodiment of the present invention will be hereafter described by referring to the accompanying drawings.

Figure 1:
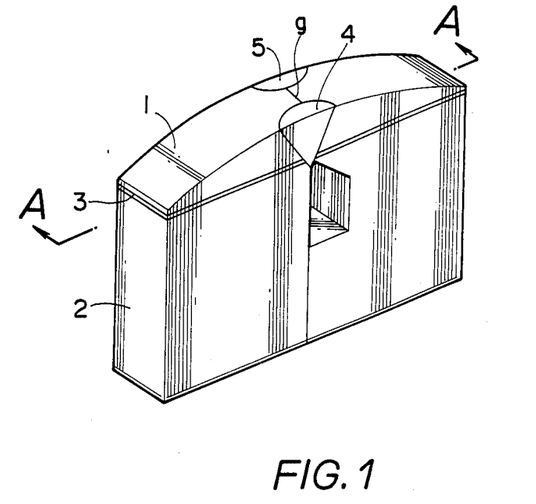
FIG. 1 is a perspective view showing an embodiment of a magnetic head of the present invention.
Figure 2:
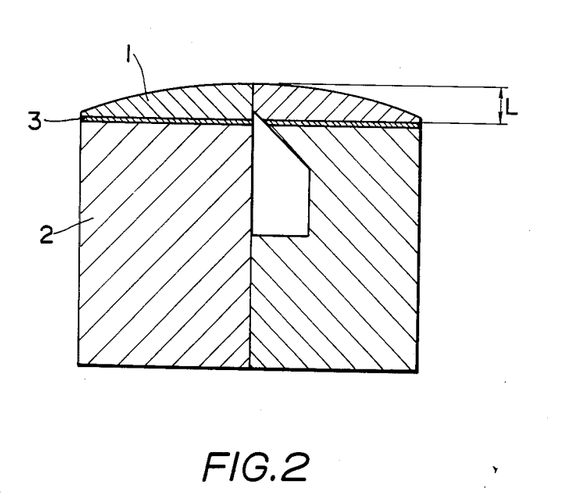
FIG. 2 is a sectional view taken along line A—A in FIG. 1.

A magnetic head of the junction ferrite type to which the present invention is applied is shown in FIGS. 1 and 2 and is composed of a single crystal ferrite portion 1 defining a magnetic gap g on an abutment surface of the head facing to the magnetic recording medium and a polycrystalline ferrite portion 2 forming a major portion of the magnetic circuit on the back gap side of the magnetic head. These single crystal and polycrystalline ferrite portions are bonded together through the medium of an oxide magnetic thin film 3. In the vicinity of the magnetic gap g, there are formed track width regulating grooves for setting the track width to a prescribed value. In these grooves, there are charged non-magnetic fillers 4, 5, such as high melting glass fillers, for assuring sliding abutment of the magnetic recording medium with the magnetic head.

In the junction ferrite type magnetic head, the magnetic gap is constituted of a single crystal ferrite having a high saturation flux density for compatibility with a magnetic recording medium having a high coercive force. The major portion of the magnetic circuit excluding the head tip portion in the vicinity of the front gap consists of a polycrystalline ferrite having a high magnetic permeability in order to elevate the mean magnetic permeability of the magnetic head. This results in magnetic properties at the time of recording that are equivalent to those of the magnetic head formed as a whole of a high saturation flux density material so that an acceptable recording may be achieved even on the high coercive force magnetic recording medium. During reproduction, good electromagnetic conversion properties may be realized because of the higher value of the mean magnetic permeability of the magnetic head.

It is an important feature of the present invention that an oxide magnetic thin film 3 of a film thickness of 1 to 5 micron is interposed at the junction surface between the aforementioned single crystal ferrite portion 1 and the polycrystalline ferrite portion 2.

The thin magnetic oxide film 3 has crystal grains of very fine and uniform size and exhibits a non-uniform grain growth when heated, such that, when a hot press-working operation is carried out at a temperature lower than that at which crystal grain growth of the oxide magnetic thin film 3 occurs, an interface free of inundations will be formed, there being no diffusion layer otherwise formed between the single crystal ferrite portion 1 and the polycrystalline ferrite 2. The result is that the length or thickness L of the single crystal ferrite 1 can be controlled so as not to be larger than a prescribed value.

Specific examples of the oxide magnetic thin film 3 may include ferrite magnetic thin films having a spinel crystal structure, such as ferrites of Mn-Zn-, Mn-, Ni-Zn-, Ni-, Fe-Zn or Fe- ferrite (magnetite), magnetic thin films having a garnet type crystal structure, such as YIG or GdIG, or ortho-ferrite type magnetic thin films such as $YFeO_3$.

These oxide magnetic thin films 3 can be easily formed by conventional methods, such as sputtering, vacuum evaporation, plating, CVD or LPE methods.

Therefore, when forming the magnetic head according to the present example, a single crystal ferrite block and a polycrystalline ferrite block are prepared, the junction surfaces of these blocks are machined to a mirror finish, oxide magnetic thin films are deposited on these junction surfaces to film thickness of 0.8 to 3 microns and the blocks are bonded together at the junction surfaces by hot press working. As the conditions for hot press working, a heating temperature of 1200 to 1300° C. and a pressure of 5 kg/cm² may be employed. The completed unitary block is then subjected to the conventional machining steps such as formation of the winding slots or the track width regulating slots to complete the magnetic head of the Example of the present invention.

Figure 3:
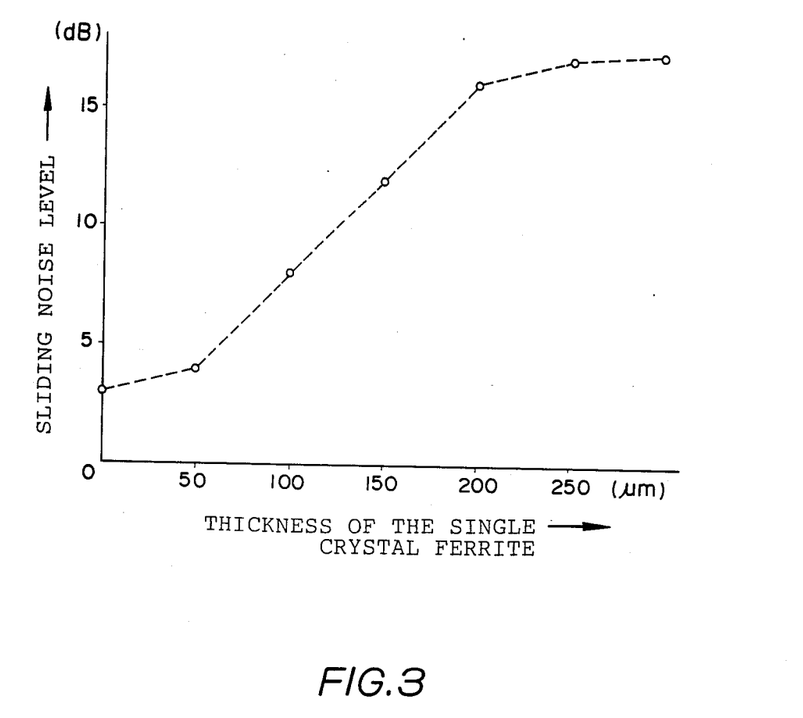
FIG. 3 is a chart showing the relation between the thickness of the single crystal ferrite portion and the slide noise level.

It should be noted that, with the above described magnetic head, the thickness L of the monocrystal ferrite portion 1 may influence the sliding noise significantly. A test was conducted by the present inventors for measuring the sliding noise for various thicknesses or lengths L of the single crystal ferrite portion 1. The results of the test are shown in FIG. 3. It is seen from this figure that the slide noise level increases acutely when the thickness or length L of the single crystal ferrite portion 1 exceeds 100 microns. Therefore, the thickness or length L of the single crystal ferrite portion is preferably designed so as to be coincident with the head depth or gap depth and equal to not more than 100 microns. In the magnetic head of the present invention, since the oxide magnetic film 3 is interposed between the single crystal and polycrystalline ferrite portions to prevent the diffusion of the ferrite monocrystals from occurring, the length L of the single crystal ferrite portion 1 can be easily controlled to a prescribed value so that L≧100 microns. On the other hand, the length is difficult to control solely with the hot press working because of diffusion such that the length L of the single crystal ferrite portion 1 may be set to a slightly larger value at the sacrifice of increasing the slide noise.

The present invention will be described further by referring to test data obtained with a magnetic head actually prepared by the present inventors.

On a single crystal ferrite block and a polycrystalline block having the following compositions, there were formed oxide magnetic thin films to film thicknesses of 3 microns, using alloy targets each having a composition of $Mn_{0.5}Zn_{0.5}Fe_2O_4$. The respective blocks were annealed at 650° C. for two hours under a nitrogen atmosphere and bonded together at the surfaces coated with the oxide magnetic thin films by hot press working for preparing the junction ferrite type magnetic head according to an Example of the present invention, such as is shown in FIG. 1. As the conditions for hot press working, a junction temperature of 1250° C., a press working pressure of 5 kg/cm² and a nitrogen atmosphere were used.

Single Crystal Ferrite Composition $Fe_2O_3$ 52.0 mol %
MnO 28.0 "
ZnO 20.0 "

Polycrystalline Ferrite Composition $Fe_2O_3$ 52.0 mol %
MnO 28.0 "
ZnO 20.0 "

Then, the single crystal ferrite and the polycrystalline ferrite having the same compsitions as above were directly bonded together by hot press working to produce a magnetic head, as a Comparative Example.

Figure 4:
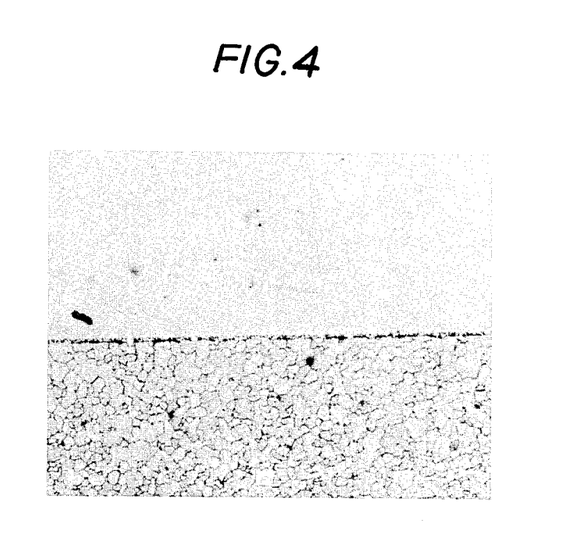
FIG. 4 is a micrograph of the interface when the oxide magnetic thin film is interposed and FIG. 5 is a micrograph of the interface when the ferrites are bonded together directly by hot press working.
Figure 5:
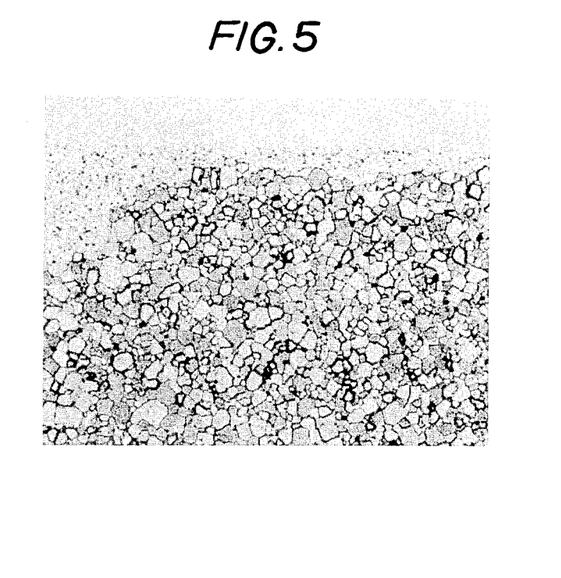

The respective junction surfaces between the single crystal and polycrystalline ferrite portions of the produced magnetic heads were observed under a microscope. FIG. 4 is a micrograph (magnification, 150) showing the crystal structure at the junction plane of the oxide magnetic thin film formed by sputtering and FIG. 5 is a micrograph showing the crystal structure (magnification, 150) showing the crystal structure at the junction plane of the oxide magnetic thin film directly formed by hot press working.

It is seen from these micrographs that, when the oxide magnetic thin film is provided as in the Example above, the interface between the single crystal ferrite and the polycrystalline ferrite is clearly defined with the oxide magnetic thin film as the boundary, such that inundations due to the dispersion of the single crystal ferrite are only barely observed at the interface between the two ferrite portions. Conversely, it will be seen that, with the head produced directly by hot press working, the thickness of the substantial single crystal ferrite portion is increased while inundations are produced at the interface between the two ferrite portions due to dispersion of the monocrystal ferrites.

The sliding noise levels of the above Example and Comparative Examples 1 and 2 were measured, wherein the Comparative Examples 1 and 2 refer to the magnetic heads produced in accordance with the Comparative Example above and having diffused layers 140 microns and 70 microns thick, respectively.

Figure 6:
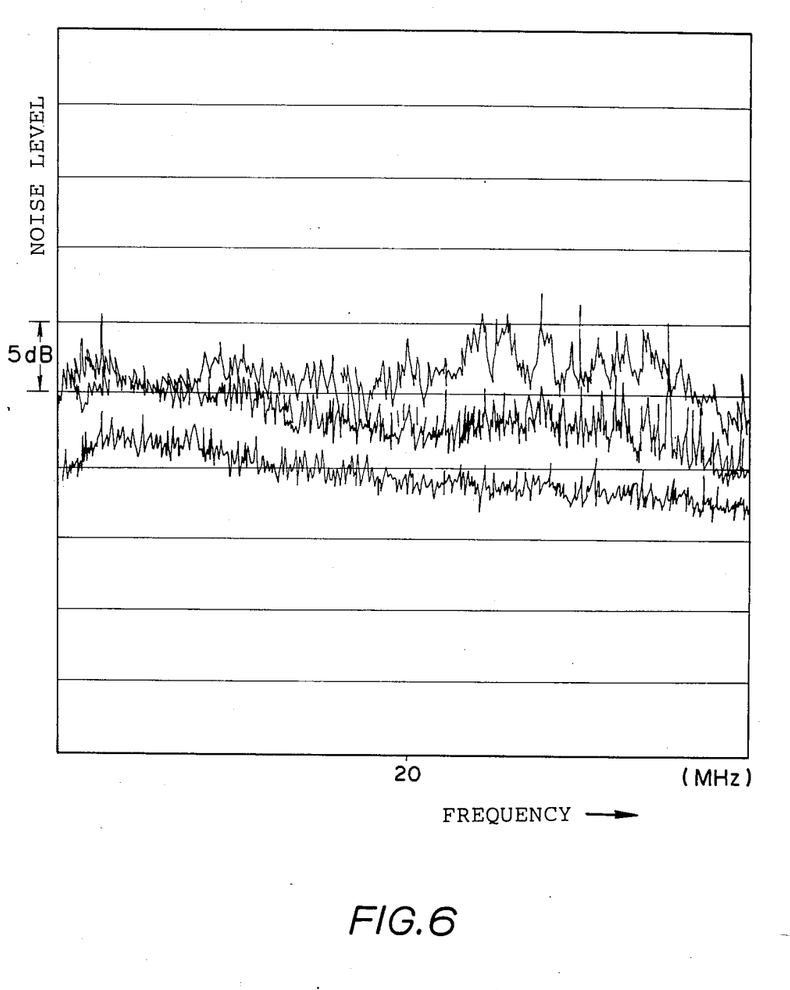
FIG. 6 is a chart showing the frequency response of the sliding noise level in an embodiment to which the present invention is applied.
Figure 7:
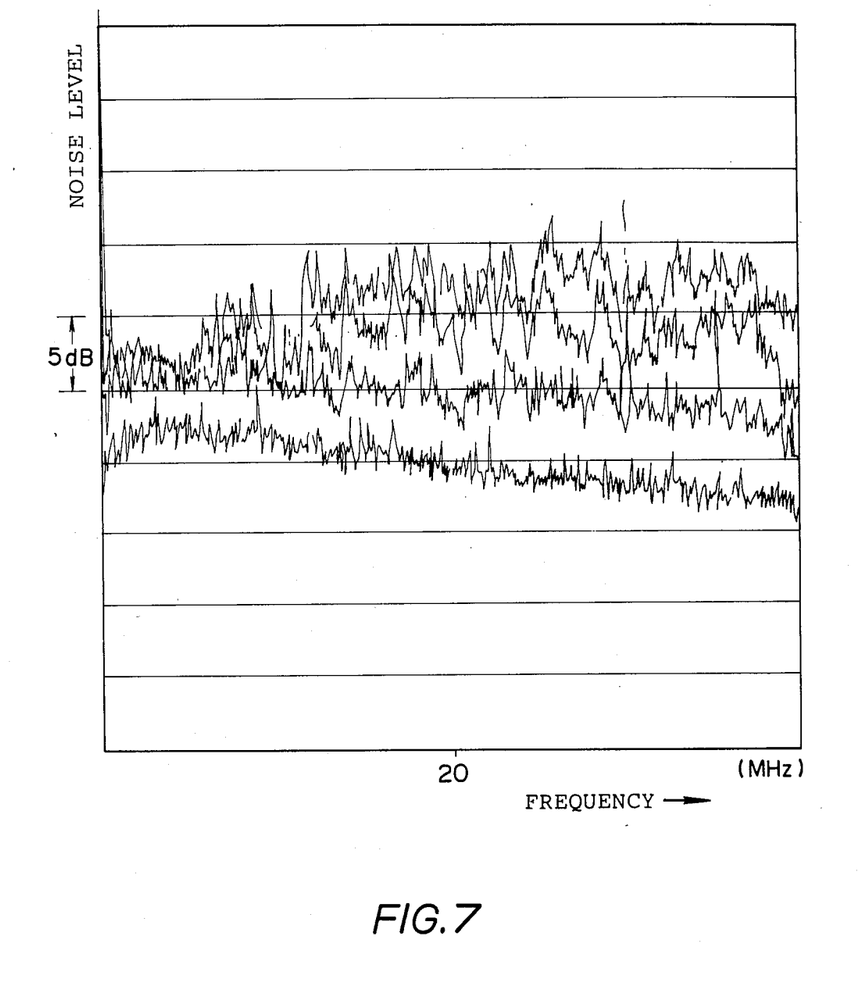
FIG. 7 is a chart showing the frequency response of the sliding noise level in a comparative embodiment.
Figure 8:
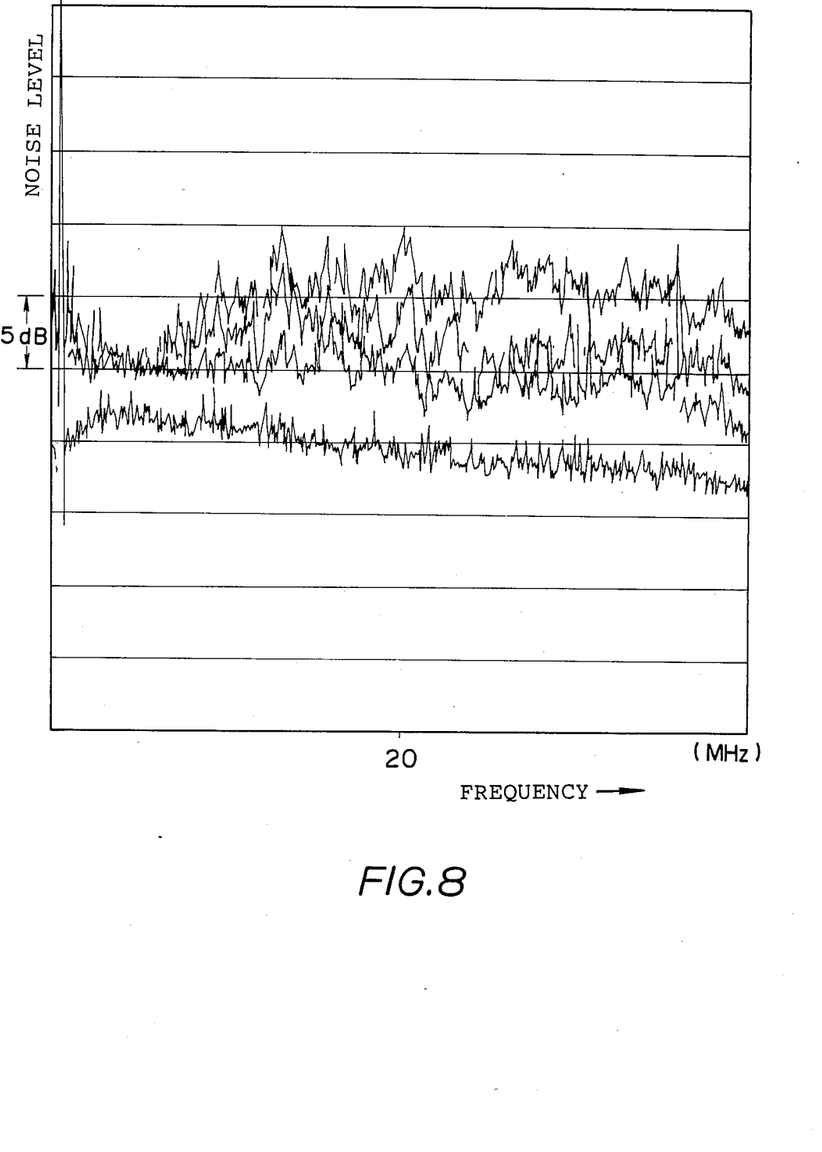
FIG. 8 is a chart showing the frequency response of the sliding noise level in another comparative embodiment.

In measuring the sliding noise level, the noise level of the system noise of a 1-inch video tape recorder was measured with a spectrum analyzer, without running the magnetic tape. Then, the demagnetized tape was run and its slide noise level was similarly measured by a spectrum analyzer. In making the measurement, a Co-coated gamma-$Fe_2O_3$ magnetic tape 1-inch wide ('V1k and V16' manufactured by the Sony Corporation, assignee of the present application), was used as the magnetic tape, while the video tape recorder ('BVH-2000' manufactured by the Sony Corporation) was used as the 1-inch video tape recorder. The results of the measurement are shown in FIGS. 6 to 8. In these figures, the line of the lowest noise represents the system noise level while the other three lines represent the slide noise levels obtained with different combinations of the magnetic tapes and the 1-inch video tape recorders.

FIG. 6 shows the slide noise level for the Example of the present invention. It is seen from the figure that the slide noise is at a lower level for any of the magnetic tapes and video tape recorders employed. Conversely, the slide noise for the Comparative Example 1 shown in FIG. 7 and that for the Comparative Example 2 shown in FIG. 8 are at a rather high level.

Figure 9:
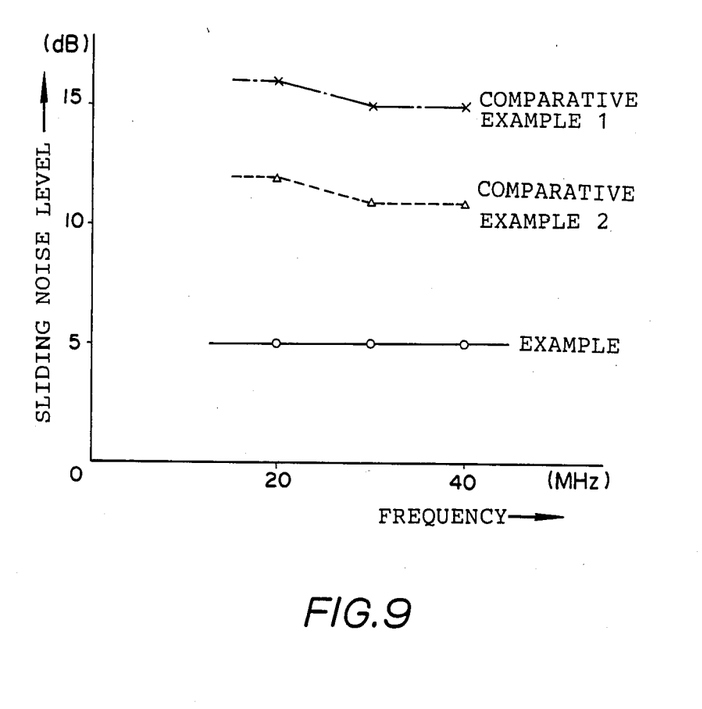
FIG. 9 is a chart showing the slide noise level in the embodiment of the present invention as compared to that in the comparative embodiments.

For better comparison of the slide noise levels of the Example and the Comparative Example, the slide noise levels at the frequencies of 20, 30 and 40 MHz were plotted commonly on one drawing sheet. The chart thus obtained is shown in FIG. 9. The data given was obtained with the use of the 1-inch magnetic tape V-lk and the video tape recorder BVH-2000, both manufactured by the Sony Corporation, assignee of the present application.

It is seen from this figure that the slide noise level may be improved at least by 5 dB by providing the oxide film at the interface between the single crystal ferrite and the polycrystalline ferrite.

It is to be noted that the present invention is not limited to the above described preferred embodiment, but may be applied to a composite type magnetic head including magnetic core halves each being constituted of an oxide magnetic material and a magnetic metal thin film.

Figure 10:
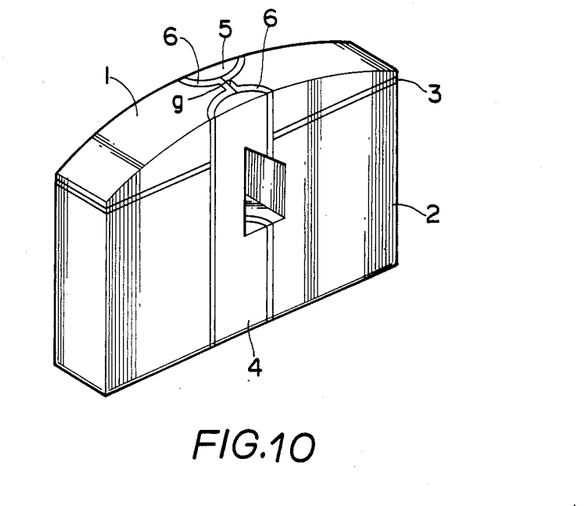
FIG. 10 is a perspective view showing another embodiment of a magnetic head of the present invention.

For example, as shown in FIG. 10, a magnetic metal thin film 6 may be applied to each of the abutting surfaces of the magnetic core parts consisting of a monocrystal ferrite portion 1 and a polycrystalline ferrite portion 2 bonded to each other such that the magnetic gap g is defined between these magnetic metal thin films.

With the magnetic head of the present embodiment, not only the above described magnetic metal thin film but also the monocrystal ferrite portion 1 have high saturation magnetic flux densities at the time of recording, so that satisfactory recording may be made even on a high coercive force magnetic recording medium.

Figure 11:
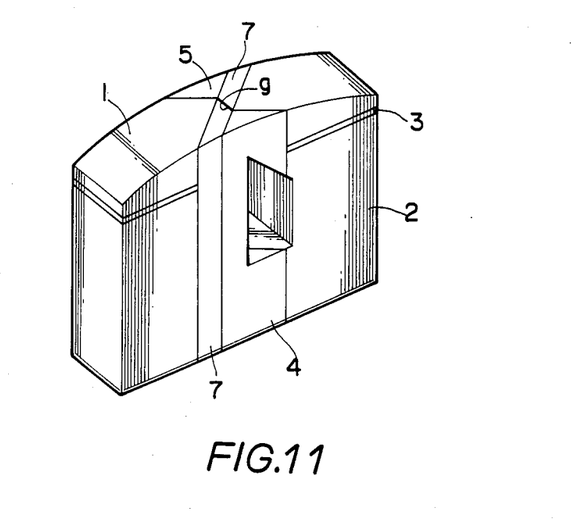
FIG. 11 is a perspective view showing another embodiment of a magnetic head of the present invention.

Alternatively, as shown in FIG. 11, the abutting surfaces of the monocrystal ferrite portion 1 and the polycrystalline ferrite portion 2 bonded to each other to form the magnetic core part may be cut obliquely to form inclined surfaces, and magnetic thin films 7 are then applied to these inclined surfaces such that there is provided a composite magnetic head having the junction surfaces of these magnetic metal thin films 7 as the magnetic gap g. The composite magnetic head evidences only small slide noise and exhibits optimum reproducing characteristics. In addition, the magnetic head is suitable for high density recording, while a narrow track width is also achieved, since the track width is regulated by the film thickness of the magnetic metal thin film 7.

The materials for the upper magnetic film 6, 7 may include ferromagnetic non-crystalline metal alloys or so-called amorphous alloys, Fe-Al-Si, Fe-Ni, Fe-Al, Fe-Si-Co or Fe-Ga-Si alloys. The upper magnetic film is not limited to the single layer films as described herein but may also be formed by alternate laminations of high wear resistant insulating films such as $SiO_2$, $Ta_2O_5$, $Al_2O_3$, $ZrO_2$ or $Si_3N_4$ and a thin film of the above enumerated magnetic metal materials.

We claim as our invention:

1. A composite type magnetic head including a single crystal ferrite having a magnetic gap at the portion which contacts the magnetic recording medium and a polycrystalline ferrite magnetically coupled to said single crystal ferrite and having a portion constituting a back magnetic circuit, and an oxide magnetic thin film at the junction interface between said single crystal ferrite portion and the polycrystalline ferrite portion, said thin film resulting from crystal grains of very fine and uniform size which exhibit non-uniform grain growth when heated.

2. A composite type magnetic head including a single crystal ferrite having a magnetic gap at the portion which contacts a magnetic recording medium and a polycrystalline ferrite facing said single crystal ferrite and having a portion constituting a back magnetic circuit, and at least one oxide magnetic thin film at the junction interface between said single crystal ferrite portion and the polycrystalline ferrite portion, said single crystal ferrite portion including a plurality of magnetic thin films which contact each other to form a magnetic gap.

3. A composite type magnetic head according to claim 1 wherein the oxide magnetic film is a ferrite magnetic thin film having a spinel type crystal structure.

4. A composite type magnetic head according to claim 2 wherein the oxide magnetic thin film is a ferrite magnetic thin film having a spinel type crystal structure.

5. A composite type magnetic head according to claim 1 wherein the oxide magnetic thin film has a film thickness in the range of 0.8 to 3 microns.

6. A composite type magnetic head according to claim 2 wherein the oxide magnetic thin film has a film thickness in the range of 0.8 to 3 microns.

7. A composite type magnetic head according to claim 1 wherein the single crystal ferrite has a depthwise dimension of not larger than 100 microns.

8. A composite type magnetic head according to claim 2 wherein the single crystal ferrite has a depthwise dimension of not larger than 100 microns.

* * * * *